Patented Aug. 22, 1933

1,923,735

UNITED STATES PATENT OFFICE 1,923,735

ANTIOXIDANT OR AGE-RETARDER FOR RUBBER COMPOUNDS

Werner M. Lauter, Akron, Ohio, assignor to The Goodyear Tire & Rubber Company, Akron, Ohio, a Corporation of Ohio No Drawing. Application October 5, 1929
Serial No. 397,739

11 Claims. (Cl. 18—50)

My invention relates to methods of treating rubber and other similar organic compounds and it has particular relation to the provision of a rubber compound which is highly durable in character and which possesses exceptionally high elasticity and tensile strength.

One object of the invention is to provide a rubber compound which resists the action of oxygen, light and similar weathering agencies to a remarkable degree. Other objects and advantages will become apparent as the description of the invention proceeds.

Heretofore, it has been observed that rubber compounds, upon exposure to air and the light, apparently absorb oxygen even at normal temperatures, and as a result the compound gradually loses its flexibility, elasticity and tensile strength. In the course of time such compounds become brittle and finally crack and break upon being subjected to flexure or strain. In order to overcome this defect it has heretofore been proposed to incorporate in the compounds certain organic materials, such as hydroquinone, diphenyl amine; and reaction products of aldehydes, such as croton aldehyde and such amines as diphenylguanidine. Although these compounds resist the action of atmospheric oxygen, the effect in some cases is not so pronounced as might be desired. Furthermore, some of the compounds are objectionable because they do not blend readily with rubber or because they possess strong and disagreeable odors which render the task of handling them extremely disagreeable.

My invention resides in the discovery that certain di-sulphur substituted diaryl amines constitute highly efficient antioxidants or age-retarders in rubber compounds, and are substantially free from most of the defects heretofore encountered in connection with many of the age-retarders heretofore employed. As a specific example of such compounds, attention is directed to dithio phenyl beta naphthaylamine which may be prepared from phenyl beta naphthylamine and sulphur chloride (S₂Cl₂). In the preparation of the material, the basic compounds are dissolved in a suitable solvent, such as cold benzene, in approximately molecular proportions and left standing for a period of time. The resultant dithio beta naphthylamine has the formula:

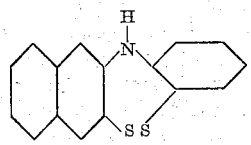

The substance, when pure, is of fine crystalline structure and has a pronounced greenish color. It decomposes with fusion at a temperature of approximately 140° C. The crude material obtained from the mother liquor by evaporation of the excess solvents is relatively pure in character and may be used for many purposes without further purification. However, if desired, it may be further purified by washing it with benzene and petroleum ether. The material is substantially non-odorous and blends readily with the rubber upon a mill. For that reason it is quite easy to incorporate in the rubber, without any special precautions to prevent the liberation of undesirable fumes and odors. The compound may be employed as an antioxidant in most of the standard rubber formulæ. However, the following is a typical example of a compound in which it has been found by experience to be particularly satisfactory:

| | |
|---|---|
| Acetone extracted rubber | 100 parts |
| Zinc oxide | 5 parts |
| Sulphur | 3 parts |
| Hexamethylene tetra amine | 1 part |
| Stearic acid | 1.5 parts |
| Antioxidant | 1 part |

Samples of rubber prepared in accordance with the preceding formula were vulcanized for varying periods of time, after which they were divided into two identical sets of samples, one of which was subjected immediately to physical tests in order to ascertain the elasticity and tensile strength thereof, while the second set was weighed, placed in an oxygen bomb and exposed to oxygen under a pressure of 150 pounds per square inch at a temperature of 50° C. for a period of six days. The samples were then removed from the bomb, weighed a second time in order to ascertain the percent of oxygen absorbed thereby, and subjected to the same physical tests conducted in connection with the unaged samples. The results of these tests are contained in the following tables:

*Dithio phenyl beta naphthylamine*

| Cure | | Load kgs/cm² | | | Elong. at break | Inc. in weight |
|---|---|---|---|---|---|---|
| Time in mins. | Temperature F° | At 500% elong. | At 700% elong. | At break | In per cent | In per cent |
| ORIGINAL | | | | | | |
| 35 | 285 | 13 | 41 | 106 | 870 | |
| 40 | 285 | 19 | 69 | 136 | 820 | 870 |
| 70 | 285 | 30 | 114 | 158 | 755 | |
| AGED | | | | | | |
| 35 | 285 | 15 | 49 | 110 | 845 | .19 |
| 50 | 285 | 21 | 75 | 128 | 795 | .22 |
| 70 | 285 | 31 | 115 | 140 | 730 | .38 |

From these tests it is apparent that rubber containing dithio phenyl beta naphthylamine does not readily absorb oxygen even under the extreme conditions existing in the oxygen bomb, and also that it retains its original tensile strength and elasticity far better than rubbers containing no antixodant. In fact, the latter materials when subjected to similar conditions, are reduced to resinous masses substantially devoid of elasticity and tensile strength.

It is to be understood that the invention is not limited to the specific material described above, but it also includes analogous compounds, such as dithio dibeta or dialpha naphthylamines, dithio diphenyl amine, dithio tolyl naphthylamine, dithio phenyl alpha naphthylamine, dithio xylyl naphthylamine (either alpha or beta), dithio hydroxy phenyl naphthylamine (either alpha or beta), dithio mono nitro phenyl naphthylamine and many similar compounds, all of which may be prepared from the corresponding secondary amines by methods analogous to that described in connection with the preparation of dithio phenyl beta naphthylamine.

Although I have described in detail only the preferred embodiments of the invention, it will be apparent to those skilled in the art that it is not so limited, but that various minor modifications may be made therein without departing from the spirit of the invention or from the scope of the appended claims. It is intended that the patent shall cover, by suitable expression in the appended claims, whatever features of patentable novelty reside in the invention.

What I claim is:

1. A method of preserving rubber which comprises subjecting it to vulcanization in the presence of a material having the following structural formula:

in which R is a benzene group and R₁ is a naphthylene group.

2. A method of preserving rubber which comprises subjecting it to vulcanization in the presence of a material having the following structural formula:

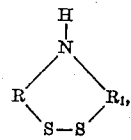

in which R is a naphthylene group and R₁ is a hydroxy substituted benzene group.

3. A method of preserving rubber which comprises subjecting it to vulcanization in the presence of a material having the following structural formula:

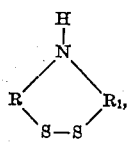

in which R is a beta naphthylene group and R₁ is a hydroxy substituted benzene group.

4. A method of preserving rubber which comprises subjecting it to vulcanization in the presence of dithio phenyl beta naphthylamine.

5. A rubber product that has been vulcanized in the presence of dithio phenyl beta naphthylamine.

6. A rubber product that has been vulcanized in the presence of a material having the formula:

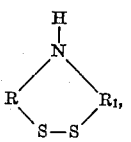

in which R is a naphthylene group and R₁ is a benzene group.

7. A rubber product that has been vulcanized in the presence of a material having the formula:

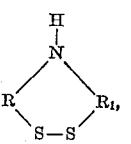

in which R is a naphthylene group and R₁ is a hydroxy substituted benzene group.

8. A rubber product that has been vulcanized in the presence of a material having the following formula:

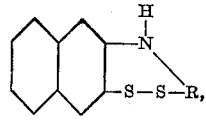

in which R is an aryl group.

9. A rubber product that has been vulcanized in the presence of a material having the following formula:

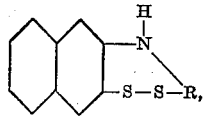

in which R is a benzene group.

10. A rubber product that has been vulcanized in the presence of a material having the formula:
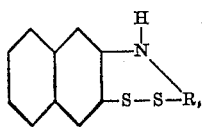
in which R is a methyl substituted benzene group.
11. A method of preserving rubber which comprises subjecting it to vulcanization in the presence of a reaction product of phenyl beta naththylamine and sulfur chloride.
WERNER M. LAUTER.

DISCLAIMER 1,923,735.—*Werner M. Lauter*, Akron, Ohio. ANTIOXIDANT OR AGE-RETARDER FOR RUBBER COMPOUNDS. Patent dated August 22, 1933. Disclaimer filed February 27, 1935, by the assignee, *The Goodyear Tire & Rubber Company*.

Hereby enters this disclaimer to said claims 1, 4, 5, 6, 8, 9, and 11 which are in the following words, to wit:

"1. A method of preserving rubber which comprises subjecting it to vulcanization in the presence of a material having the following structural formula

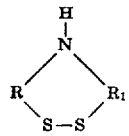

in which R is a benzene group and $R_1$ is a naphthylene group."

"4. A method of preserving rubber which comprises subjecting it to vulcanization in the presence of dithio phenyl beta naphthylamine."

"5. A rubber product that has been vulcanized in the presence of dithio phenyl beta naphthylamine."

"6. A rubber product that has been vulcanized in the presence of a material having the formula

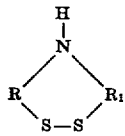

in which R is a naphthylene group and $R_1$ is a benzene group."

"8. A rubber product that has been vulcanized in the presence of a material having the following formula

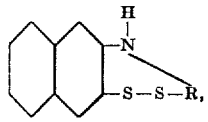

in which R is an aryl group."

"9. A rubber product that has been vulcanized in the presence of a material having the following formula

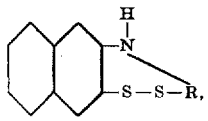

in which R is a benzene group."

"11. A method of preserving rubber which comprises subjecting it to vulcanization in the presence of a reaction product of phenyl beta naphthylamine and sulfur chloride."

[*Official Gazette March 19, 1935.*]